United States Patent
Eschler

[11] 3,964,825
[45] June 22, 1976

[54] APPARATUS AND PROCESS FOR DEFLECTING THE DIRECTION OF LIGHT BEAMS IN A CONTROLLABLE FASHION

[75] Inventor: Hans Eschler, Munich, Germany

[73] Assignee: Siemens Aktiengesellschaft, Berlin & Munich, Germany

[22] Filed: Nov. 27, 1974

[21] Appl. No.: 527,893

[30] Foreign Application Priority Data
Nov. 29, 1973 Germany............................ 2359556

[52] U.S. Cl. ................................................. 350/161
[51] Int. Cl.² ............................................. G02F 1/33
[58] Field of Search ....................... 350/161, 160 R

[56] References Cited
UNITED STATES PATENTS

| | | |
|---|---|---|
| 2,267,251 | 12/1941 | Okolicshnyi ........................ 350/161 |
| 3,529,263 | 9/1970 | Simmons............................. 350/161 |
| 3,851,951 | 12/1974 | Eveleth ............................... 350/161 |

*Primary Examiner*—Eli Lieberman
*Attorney, Agent, or Firm*—Hill, Gross, Simpson, Van Santen, Steadman, Chiara & Simpson

[57] ABSTRACT

An acousto-optic light deflector for controllably deflecting light beams in an optical system characterized by the deflectors being arranged in a matrix and wherein each deflector has a shape so that a standing sound wave is utilized to form a phase grating therein. Each of the units is provided with a piezoelectric transducer which creates a high frequency ultrasonic standing wave having a frequency between 30 and 200 MHz. The system may include an optical device for focusing all of the beams deflected in the same direction to a single spot on a plane.

9 Claims, 3 Drawing Figures

APPARATUS AND PROCESS FOR DEFLECTING THE DIRECTION OF LIGHT BEAMS IN A CONTROLLABLE FASHION

BACKGROUND OF THE INVENTION

1. Field of the Invention

The present invention is directed to a process and an apparatus for deflecting the direction of a plurality of light beams in a controllable fashion in particular for a wide-band optical data switching system. The process and apparatus utilizes acousto-optic light deflectors which can deflect an oncoming light beam in at least $10^4$ discrete directions of deflection.

2. Prior Art

On account of their simplicity, acousto-optic light deflectors can be used advantageously for many applications. These applications include optical data transmission systems, optical storage systems, display devices, and optical printers.

An optical beam can be optionally deflected with the acousto-optic light deflector within microseconds into one of $10^3$ to $10^5$ discrete directions of deflection. Known acousto-optic light deflectors were constructed so that a sound wave would advance therethrough and be removed from the unit and the advancing sound waves deflect a light beam, for example a laser beam, so that the switching time between two arbitrary beam directions is governed by the transit time of the sound waves through the cross section of the light beam. Thus typical acousto-optic light deflectors have aa switching time between 1 and 10 $\mu s$.

In addition to crystals such as iodic acid, lead molybdate and paratellurite, other suitable deflecting media are glass bodies which have a high index of refraction such as flint glass. In order to achieve a technically useful efficiency of more than 50%, an electric control signal for creating advancing sound waves in the glass bodies, for example, will require a power of 2 to 10 watts.

If a deflector matrix is to be constructed of $10^3$ to $10^4$ acousto-optic light deflectors which matrix, for example, would be required in either a wide-band optical data switching system or a holographic data storage system, the high driving power, which is required for each individual deflector, means that the cost for constructing the matrix becomes unacceptably high. Furthermore, since the electrical power requirement for each deflector generally exceeds more than 2 watts, it is not possible to use inexpensive, integrated or printed circuits for the electric control system.

SUMMARY OF THE INVENTION

The present invention is directed to an apparatus and process for the controlling deflection of light beams into selected directions which process and apparatus reduces expenses for a light deflector matrix by a factor of 10 to 100 in comparison with known deflector matrices and which matrix has a deflection efficiency of 50% and utilizes an electrical control power of less than 1 watt per deflector unit. To accomplish these tasks the process comprising providing a plurality of acousto-optic light deflectors with each light deflector being capable of deflecting a light beam into at least $10^4$ discrete directions of deflection, passing light beams through the plurality of deflectors and selectively creating sound waves in individual deflectors to deflect the beam passing therethrough with the improvement comprising the step of providing the individual deflectors providing the deflector units in a matrix arrangement and wherein the step of creating a sound wave in each of the deflector units creates a standing sound wave therein. Preferably, the sound wave is produced in the light deflector units is a standing, high-frequency ultrasonic wave in the frequency range of from 30 to 200 MHz which produce an optical phase grating.

A suitable apparaus for executing the process of the invention includes a plurality of acousto-optic light deflectors for deflecting the light beams from a source of light of light beams with the improvement comprising the plurality of light deflectors consisting of a matrix of transparent bodies, such as glass or fused quartz bodies, with each body being provided with a piezoelectric transducer for each deflector unit. The body for each deflector unit has a shape so that a sound wave formed by the piezoelectric transducer is a standing sound wave running in a direction at approximately right angles to the direcction of propagation of light through the unit. The improvement of the system includes a beam shaping means, such as an optical element disposed between the matrix and a plane for focusing all of the beams which were deflected in the same direction to a point on the plane. Preferably, the optical element is a convex lens which is spaced from both the matrix and plane by an interval equal to its focal length and the plane may contain a plurality of light detectors. While the matrix of deflector units may be used to modulate individual beams, the system may include a plurality of modulators to superimpose data onto the individual beams of light.

DESCRIPTION OF THE PREFERRED EMBODIMENTS

Figure 1:
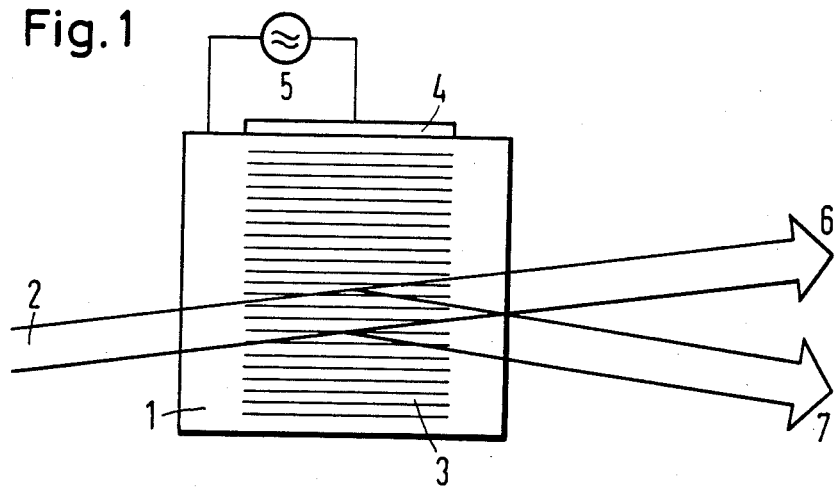
FIG. 1 is a schematic illustration of an individual light deflector unit in accordance with the present invention.

The principles of the present invention are particularly useful in a light deflector unit 1 which deflector has a transparent body having a parallelepiped configuration with rectangular walls and is composed of transparent materials such as glass or quartz glass. An oscillator 5 is connected to a piezoelectric transducer 4 which is bonded onto one wall of the body and creates a standing, high frequency, ultrasonic wave 3 in the light deflector unit 1 with the frequency of the wave preferably between 30 and 200 MHz. The sound wave 3 produces an optical phase grating through which a light beam, for example a laser beam 2, is directed at a Bragg angle and is partially diffracted. The angle of diffraction changes in proportion to the sound frequency of the standing wave 3. The beam 2 has a zero order or undiffracted portion 6 and the frequency of the standing wave 3 causes a first order of diffraction which is illustrated as beam 7.

The standing wave 3 means an improvement in the efficiency of the opto-acoustical interaction due to the considerably better exploitation of the sound power than in the case of deflection unit utilizing the advancing sound wave. This gain of improved efficiency enables a considerable gain in simplicity of the construction of the light deflector unit on account of the high acousto-optical efficiency of the unit. It is possible to use less efficient materials for the transparent bodies which materials are inexpensive and easy to process, such as glass or fused quartz, and which require an electrical driving power for the transducer 4 of under 1 watt. In addition, the improved efficiency provides further advantages by enabling the selection of a suitable sound medium which selection need no longer be made with the view of finding a particularly high acousto-optic figure of merit but enables consideration of characteristics such as low sound attenuation, favorable thermal behavior, easy processibility, optical homogeneity and mechanical and chemical stability to be taken into account to a greater extent than before. In addition, the advantages of the present deflector unit enables the possibility of constructing the drive electronics from simple and inexpensive integrated or printed circuits and the use of inexpensive piezoelectric transducers for example quartz transducers. The use of the standing sound waves is particularly suitable for a deflecting matrix in an optical data switching system where switching times of less than 100 ms are sufficient.

The body of the unit 1 is constructed so that the sound wave is reflected back and forth to create the standing wave 3. On account of the frequent back and forth movement of the sound wave 3, the sound power is better exploited by a factor of 10 to 50 than in the case of deflection unit utilizing advancing sound waves. Even with deflecting materials such as fused quartz, this leads to efficiencies of 20 to 50%. Suitable materials for the piezoelectric transducer would be quartz crystal which is applied by gluing, pasting or bonding or a layer of cadmium sulphide or tin oxide which may be applied by vapor deposition.

A part from the above mentioned materials for the transparent body other non-crystalline substances, such as synthetic resins can be used as the deflecting medium.

Figure 2:
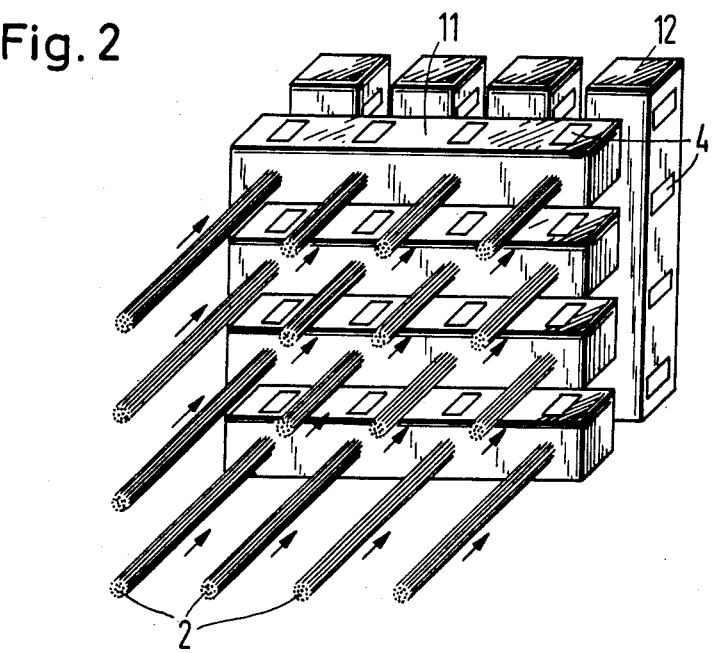
FIG. 2 is an isometric view of a matrix arrangement of the light deflector units of the present invention.

FIG. 2 shows an overall arrangement composed of n · n two-stage acousto-optic light deflectors in accordance with the invention which consists of $2n^2$ individual elements or units. As illustrated, the matrix has sixteen two-stage acousto-optical light deflector units to handle sixteen beams 2 which may be formed from a laser beam by passing it through a fly eye lens array or other conventional device. The advantage of simplification is achieved by the invention becomes particularly clear as in the case of n identical deflector units can be combined to form either a single row 11 or column 12 depending on whether the light beams 2 are to be deflected vertically or horizontally. It is particularly advantageous to assign each of the rows 11 and the columns 12 to be completely identical so that the matrix is composed of a total of only 2n such individual basic elements. As all the basic elements have the same dimensions, they can be commonly processed and equipped with the piezoelectric transducers 4 (one for each unit) which may be pressed on by known connecting technique or vapor deposited in a common operation. The electrodes serving to supply electrical power to the transducers can likewise be applied in one operation such as by a vapor deposition.

The cost of the electronic controls for each individual deflector unit are particularly advantageous for the possibilities of the practical use of the deflector matrix in accordance with the invention. Various possible designs of the electronic controls are already described in an article by H. Eschler in a German magazine, Frequenz, Volume 26, No. 5, May 1972, pages 124–129. Each of the control frequencies of a one-stage deflector unit can be produced by a permanently set, constantly oscillating oscillator. Each oscillator is assigned an electronic switch which either switches the oscillator signal to a collective line to be applied to the transducer or suppresses it. In operation, the switches are controlled in such a way that only one single frequency is switched on and all of the other frequencies are blocked. The drive stage can be in the form of particularly simple and inexpensive integrated or printed circuits which supply the HF power required for the operation of the individual deflector units.

As the frequency resolution is the same for all the deflector units, the chain of discrete HF oscillators is required only once for a two-stage horizontal and vertical deflecting deflector matrix. Since in the case of a standing sound wave, the control frequency must agree with a high degree of accuracy with the mechanical resonance of the deflector units, it is necessary to construct the oscillators with quartz accuracy. As, however, only one oscillator chain is required for the two-stage deflector matrix, the outlay for the overall control is nevertheless kept low. All the electronic switching elements required for the individual deflector units of each stage may be realized with simple and inexpensive integrated or printed circuit techniques.

The matrix which has rows and columns 11 and 12 of deflector units, as illutrated in FIG. 2, is not only suitable for optical data transmission and switching but is also particularly well suited as a component for a holographic-optical data storage system in which holograms are formed through the superimposition of various reference waves. A favorable use of the matrix is that of an electronically switchable data input masks where a particular advantage consists in that the individual deflector element or units can be switched on or off very rapidly, for example with the frequency of up to 50 kHz. When associated with a Fourier transformation lens, a data input mask of this type if simultaneously a switchable lattice of light sources and a device for positioning the object beam onto the desired parts of the storage area of a data storage system.

Figure 3:
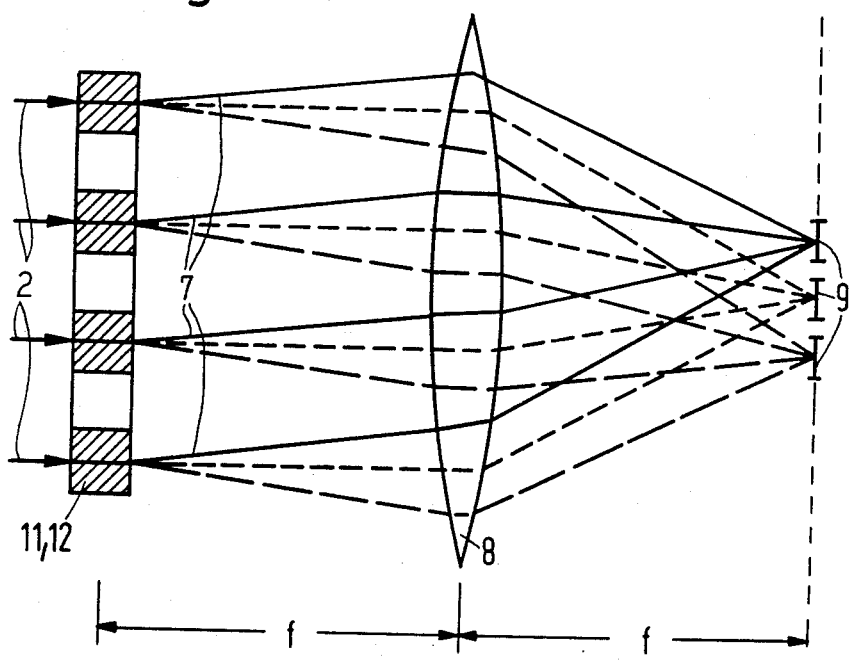
FIG. 3 is a schematic illustration of the matrix of light deflector units used in Fourier transformation of the deflected beams in accordance with the present invention.

For possible uses of the deflector matrix having the rows 11 and columns 12 of units in accordance with the present invention, for example in an optical data switching system or holographic storage system, it is desirable to carry out a Fourier transformation of the deflected beams 7 as best illustrated in FIG. 3. For this purpose between the matrix of rows 11 and columns 12 and a plane on which detectors 9 are arranged there is provided a convex lens 8, whose focal length is f and which is spaced from the detector matrix and the detector plane by its focal length f. In the Fourier plane in which the detectors 9 are arranged, the beams 7 (three different directions illustrated for each beam) which have been deflected in the same direction from all the individual deflector units will meet at a point or spot. In an optical switching system it is thus insured that all incoming channels have the same target address, for example having the same direction of deflection, and meet the same outgoing channel when the detector 9 assigned to the outgoing channel are located in the Fourier plane.

If the deflector matrix of rows 11 and columns 12 is placed in a holographic storage system with superimposed holograms, and if the storage hologram is arranged in the Fourier plane, the direction of the deflected beams 7 determines a specific position of the storage area and the location of the individual deflector units determines the direction which information is read-out or written into the holographic storage medium.

The two dimensional light deflector matrix of columns 11 and rows 12 in accordance with the present invention may be produced in an inexpensive way and by combination with an integrated optical modulation matrix, it can form extremely wide-band, parallel operating switching systems. Its band-width is not determined by the properties of the individual deflector units but only by the achievable band-width of the modulators.

Although various minor modifications might be suggested by those versed in the art, it should be understood that I wish to employ within the scope of the patent granted hereon, all such modifications as reasonably and properly come within the scope of my contribution to the art.

I claim:

1. In an apparatus for handling light beams from a source of light beams, and including a plurality of acousto-optic light deflector units, the improvement comprising said plurality of light deflector units consisting of a matrix of transparent bodies, each body being provided with a piezoelectric transducer for each unit in the body to create a high frequency ultrasonic wave having a frequency range of between 30 and 200 MHz in each of the deflector units, the body for each unit having a shape so that the sound wave formed by the piezoelectric transducer is a standing sound wave running in a direction at right angles to the direction of the propagation of the light through the unit to create an optical phase grating in each deflector unit and the apparatus including beam-shaping means disposed between a plane and the matrix of light deflector units for focusing all of the beams deflected in the same direction to a spot on the plane.

2. In a process for deflecting the direction of a plurality of light beams in a controllable fashion and particularly in a wide-band optical switching system, said process comprising providing a plurality of acousto-optic light deflector units with each light deflector unit being capable of deflecting a light beam into at least $10^4$ discrete directions of deflection, passing light beams through the plurality of deflector units and selectively creating a sound wave in the individual deflector units to deflect the beam passing therethrough, the improvements comprising the step of providing the individual deflector units providing the units in a matrix arrangement, the step of creating a sound wave in each deflector unit creating a standing, high frequency ultrasonic wave having a frequency range between 30 and 200 MHz to create an optical phase grating in each deflector until and focusing the beams passing through the matrix onto a plane with all of the beams that were deflected in the same direction being focused to a point on said plane.

3. In a process according to claim 2, wherein the step of providing a matrix of deflector units provide a two-stage deflector for each light beam with the direction of propagation of the sound wave in one stage being at right angles to the direction of progapation of the other stage.

4. In an apparatus comprising a source of light, a plurality of modulators which impose items of data upon the light beams emitted from the source of light, a plurality of acousto-optical light deflector units, and a plurality of light detectors, the improvement comprising said plurality of light deflector units consisting of a matrix of transparent bodies, said bodies being provided with a piezoelectric transducer to create a high frequency ultrasonic wave having a frequency range of between 30 to 200 MHz in each of the deflector units, the body for each unit having a shape so that the ultrasonic wave formed by the piezoelectric transducer is a standing sound wave running in a direction at right angles to the direction of the propagation of the light through the unit to create an optical phase grating in each deflector unit and the apparatus including a beam-shaping optic which is disposed between the plurality of detectors which are arranged in one plane and the matrix of light deflector units.

5. In an arrangement according to claim 4, wherein the beam-shaping optic is a convex lens having a focal length, said lens being spaced a distance of the focal length from both the matrix of light deflector units and from the plane of the light detectors.

6. In an apparatus according to claim 4, wherein each of said bodies is a glass body.

7. In an apparatus according to claim 4, wherein each of said bodies is a fused quartz body.

8. In an apparatus according to claim 4, wherein said matrix of transparent bodies provide n x n deflector units.

9. In an apparatus according to claim 4, wherein each of said deflector units is a two-stage unit and wherein the matrix of transparent bodies has two groups of bodies with the direction of propagation of the sound wave in the bodies of one of the two groups being at right angles to the direction of propagation of the sound waves in the other group.

* * * * *